Patented June 21, 1932

1,864,425

UNITED STATES PATENT OFFICE

HERMANN FRITZSCHE, OF WEST DIDSBURY, ENGLAND, ASSIGNOR TO THE FIRM THE CLAYTON ANILINE COMPANY LIMITED, OF CLAYTON, GREAT BRITAIN

CONDENSATION PRODUCTS OF ALIPHATIC ALDEHYDE BISULPHITE COMPOUNDS WITH PRIMARY AROMATIC AMINES AND PROCESS OF MAKING SAME

No Drawing. Application filed August 14, 1929, Serial No. 385,975, and in Switzerland September 3, 1928.

The present invention relates to new condensation products obtained from primary aromatic amines and aldehydes which are particularly valuable in the rubber industry. It comprises the new products, the process of making same, and the rubber which has been vulcanized with the aid of the new products.

These condensation products are obtained by causing an aliphatic aldehyde to react with an aqueous solution or suspension of a product obtained by the reaction of an aliphatic aldehyde bisulphite compound with primary aromatic amines. Generally the acids thus obtained are illustrated by the following general formula

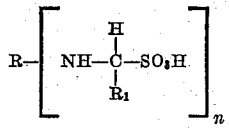

in which R stands for an aryl nucleus, $R_1$ for hydrogen or an alkyl residue, and $n$ means a whole number. According to the proportion of aldehyde used for the reaction, different products can be obtained. Products of the nature of Schiff's bases are probably formed at first and react under the existing conditions with further quantities of aldehyde to form more condensed products. Sulphurous acid is formed and is generally to be found in the mother liquor as aldehyde-bisulphite. Thus a continuous manufacture is possible. After separation of the condensation product and removal from the mother liquor of any excess of aldehyde which may be present, new quantities of amine may be added to the mother liquor which will enter into reaction with the aldehyde bisulphite. In carrying out this new process the aldehyde used for making the aldehyde bisulphite compound may be different from that used for making the subsequent condensation product.

The reaction can be effected at low or high temperature, with or without pressure. In cases where the so-called ω- or α-sulphonic acid is formed easily, the aldehyde may be caused to react with a mixture of amine and bisulphite.

Primary aromatic amines are generally suitable for the reaction. They may be mono- or poly-amines and the nucleus may contain substituents as desired.

The products thus obtained may usefully be employed in the rubber industry. They are capable of accelerating the vulcanization and of providing the finished products with excellent properties.

The following examples illustrate the invention, the parts being by weight:—

*Example 1*

150 parts of formaldehyde of 40 per cent. strength are added to a solution of 209 parts of sodium aniline-methane-ω-sulphonate of the generally accepted formula

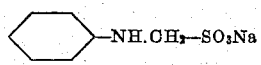

(cf. Beilstein XII, page 184) in 1000 parts of water at 70° C. The mixture is then stirred for a period of about 8 hours in a reflux apparatus in a boiling water bath. The oily precipitate becomes more and more solid during the operation. It is then isolated in the usual way and dried at 90°–100° C. It is a light yellow-brown, clear brittle resin.

*Example 2*

223 parts of sodium aniline-ethane-α-sulphonate of the generally accepted formula

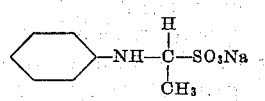

(cf. Beilstein XII, page 187) are dissolved in about 700 parts of water. The solution is cooled to 10° C., when 96 parts of acetaldehyde are added quickly with good agitation. An oily mass is precipitated and the temperature rises. It is kept at 35–40° C., for 3 hours, then raised during 1 hour to 90° C. and kept for another hour at this degree. The product, a semi-solid, sticky mass at this temperature, is separated and dried after having been washed with hot water. It is, when dried, a clear, hard, brittle, brown resin and when ground a light brown powder.

*Example 3*

100 parts of croton aldehye are added at 8° C. to a solution of 223 parts of sodium aniline-ethane-α-sulphonate of the generally accepted formula,

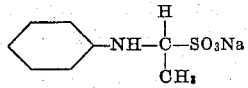

(cf. Beilstein XII, page 187) while vigorously agitating. The temperature rises slowly to about 25° C. It is kept at this degree for some time and then raised during 1 hour to 90° C. and kept at 90–95° C. for 1 hour. The precipitated condensation product is filtered. When dried, it is a brown resin.

The invention includes a process of vulcanizing rubber with aid of condensation products made in accordance with the invention.

*Example 4*

A mixture of 100 parts of pale crepe rubber, 5 parts of zinc oxide, 4 parts of sulphur, 1 part of the product made as described in Example 2, and 36 parts of chalk is vulcanized in the usual way.

What I claim is:—

1. Process for the manufacture of new condensation products, consisting in causing aliphatic aldehydes to react with an aqueous solution or suspension of the products which are obtained by the reaction of aliphatic aldehyde bisulphite compounds with primary aromatic amines.

2. Process for the manufacture of new condensation products, consisting in causing acetaldehyde to react with an aqueous solution or suspension of the products which are obtained by the reaction of an acetaldehyde bisulphite compound with primary aromatic amines.

3. Process for the manufacture of new condensation products, consisting in causing acetaldehyde to react with an aqueous solution or suspension of the products which are obtained by the reaction of an acetaldehyde bisulphite compound with aniline.

4. Process for the manufacture of a new condensation product, consisting in causing about 2 molecular proportions of acetaldehyde to react with an aqueous solution or suspension of 1 molecular proportion of the products which are obtained by the reaction of an acetaldehyde bisulphite compound with aniline.

5. As new articles of manufacture, the new condensation products which are obtained by causing aliphatic aldehydes to react with an aqueous solution or suspension of the products which are obtained by the reaction of aliphatic aldehyde bisulphite compounds with primary aromatic amines, which products vary from light-brown colored, brittle resins to brown liquids which are very valuable ingredients in the rubber mix.

6. As new articles of manufacture, the new condensation products which are obtained by causing acetaldehyde to react with an aqueous solution or suspension of the products which are obtained by the reaction of an acetaldehyde bisulphite compound with primary aromatic amines, which products vary from light-brown colored, brittle resins to brown liquids which are very valuable ingredients in the rubber mix.

7. As new articles of manufacture, the new condensation products which are obtained by causing acetaldehyde to react with an aqueous solution or suspension of the product which is obtained by the reaction of an acetaldehyde bisulphite compound with aniline, which products form light-brown to brown colored, brittle resins which are very valuable as accelerators.

8. As a new article of manufacture, the new condensation product which is obtained by causing about 2 molecular proportions of acetaldehyde to react with an aqueous solution or suspension of 1 molecular proportion of the product which is obtained by the reaction of an acetaldehyde bisulphite compound with aniline, which product forms a light-brown to brown colored, brittle resin which is very valuable as an accelerator.

In witness whereof I have hereunto signed my name this 30th day of July, 1929.

HERMANN FRITZSCHE.